US012754831B2

(12) United States Patent
Wang et al.

(10) Patent No.: US 12,754,831 B2
(45) Date of Patent: Oct. 6, 2026

(54) DEBUGGING MICROSERVICES IN TRUSTED EXECUTION ENVIRONMENTS

(71) Applicant: International Business Machines Corporation, Armonk, NY (US)

(72) Inventors: Heng Wang, Beijing (CN); Xiao Ling Chen, Beijing (CN); Ming Zhe Jiang, Beijing (CN); Xin Zheng, Beijing (CN); Wen Ji Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 18/676,746

(22) Filed: May 29, 2024

(65) Prior Publication Data

US 2025/0370918 A1 Dec. 4, 2025

(51) Int. Cl.
*G06F 11/36* (2025.01)
*G06F 9/455* (2018.01)
(Continued)

(52) U.S. Cl.
CPC ........ *G06F 11/3698* (2025.01); *G06F 11/362* (2013.01); *G06F 8/61* (2013.01);
(Continued)

(58) Field of Classification Search
CPC ............... G06F 11/3698; G06F 11/362; G06F 11/3696; G06F 11/3692; G06F 11/1441;
(Continued)

(56) References Cited

U.S. PATENT DOCUMENTS 10,846,199 B2 11/2020 Mola et al.
11,113,177 B1 * 9/2021 Chitnis ................. H04L 67/564
(Continued)

FOREIGN PATENT DOCUMENTS

WO 2024000565 A1 1/2024

OTHER PUBLICATIONS

Author unknown, "Debugging Intel Software Guard Extensions (Intel SGX) Enclaves in Microsoft Windows," White Paper Intel SGX, 2017, pp. 1-11, intel.com, accessed May 8, 2024, https://www.intel.com/content/dam/develop/external/us/en/documents/debugging-intel-sgx-enclaves-in-windows-737361.pdf.
(Continued)

*Primary Examiner* — Anibal Riveracruz
(74) *Attorney, Agent, or Firm* — Yee & Associates, P.C.

(57) ABSTRACT

Trusted execution environment microservice debugging is provided. A debug operation is performed on a microservice running in the trusted execution environment utilizing a debugger server within a trusted execution environment based on a set of microservice debug messages received from a client device of a user. A microservice debug result of performing the debug operation on the microservice running in the trusted execution environment is sent to a debugger client within a privilege separation container outside the trusted execution environment via a secure channel between a privilege separation secure channel client within the trusted execution environment and a privilege separation secure channel server within the privilege separation container outside the trusted execution environment utilizing the debugger server. The microservice debug result of performing the debug operation on the microservice running in the trusted execution environment is sent to the client device of the user utilizing the debugger client.

17 Claims, 8 Drawing Sheets

(51) Int. Cl.

| | |
|---|---|
| ***G06F 11/32*** | (2006.01) |
| ***G06F 11/362*** | (2025.01) |
| ***G06F 11/3698*** | (2025.01) |
| *G06F 8/61* | (2018.01) |
| *G06F 11/07* | (2006.01) |
| *G06F 11/14* | (2006.01) |
| *G06F 11/3604* | (2025.01) |
| *G06F 11/3668* | (2025.01) |

(52) U.S. Cl.
CPC ...... *G06F 11/0748* (2013.01); *G06F 11/0778* (2013.01); *G06F 11/1441* (2013.01); *G06F 11/323* (2013.01); *G06F 11/3608* (2013.01); *G06F 11/3644* (2013.01); *G06F 11/3656* (2013.01); *G06F 11/366* (2013.01); *G06F 11/3692* (2013.01); *G06F 11/3696* (2013.01)

(58) Field of Classification Search
CPC ............. G06F 11/0778; G06F 11/3644; G06F 11/366; G06F 11/323; G06F 11/3608; G06F 11/3664; G06F 11/3656; G06F 11/0748; G06F 8/61
See application file for complete search history.

(56) References Cited

U.S. PATENT DOCUMENTS

| | | | | |
|---|---|---|---|---|
| 11,558,265 | B1 | 1/2023 | Poornachandran et al. | |
| 11,822,641 | B2 | 11/2023 | Tsirkin et al. | |
| 2018/0137273 | A1* | 5/2018 | Bacher | G06F 11/3698 |
| 2019/0227908 | A1* | 7/2019 | Munafo | G06F 11/0748 |
| 2020/0153629 | A1 | 5/2020 | Yitbarek et al. | |
| 2020/0348361 | A1* | 11/2020 | Kurts | G06F 21/606 |
| 2022/0222337 | A1 | 7/2022 | Doshi et al. | |
| 2023/0195597 | A1 | 6/2023 | Guzman et al. | |
| 2023/0195601 | A1* | 6/2023 | Poornachandran | G06F 11/301 717/124 |
| 2023/0297696 | A1 | 9/2023 | Rogers et al. | |
| 2023/0409718 | A1 | 12/2023 | Wu et al. | |
| 2024/0160530 | A1 | 5/2024 | Das et al. | |
| 2024/0223543 | A1* | 7/2024 | Miedema | H04L 63/0428 |
| 2024/0289264 | A1* | 8/2024 | Desai | G06F 11/3688 |
| 2026/0147933 | A1 | 5/2026 | Wang et al. | |

OTHER PUBLICATIONS

Author unknown, "Google Cloud TEE Solution," Google Confidential Computing, 2024, 3 pages, accessed May 8, 2024, https://cloud.google.com/confidential-computing/confidential-vm/docs/confidential-vm-overview.

Author unknown, "IBM Cloud TEE Solution," Confidential computing with IBM, 2024, 9 pages, ibm.com, accessed May 7, 2024, https://www.ibm.com/confidential-computing.

Author unknown, "IBM Secure Execution for Linux," IBM Systems, 2024, 4 pages, ibm.com, accessed May 7, 2024, https://www.ibm.com/downloads/cas/O158MBWG?mhsrc=ibmsearch_a&mhq=Secure%20execution%20for%20Linux.

Author unknown, "Microsoft Azure TEE Solution," Microsoft Build, Apr. 2024, 5 pages, accessed May 7, 2024, https://learn.microsoft.com/en-us/azure/confidential-computing/.

Author unknown, "SGX Enclave Debugger," Intel White Paper, 2018, pp. 1-13, intel.com, accessed May 8, 2024, https://www.intel.com/content/www/us/en/content-details/671101/debugging-intel-software-guard-extensions-intel-sgx-enclaves-for-linux-operating-system.html.

Author unknown, "What is confidential computing?" IBM Think, 2024, 9 pages, accessed May 8, 2024, ibm.com, https://www.ibm.com/topics/confidential-computing.

* cited by examiner

COMPUTING ENVIRONMENT
100

400
MICROSERVICE DEBUGGING PROCESS

DEBUGGING MICROSERVICES IN TRUSTED EXECUTION ENVIRONMENTS

BACKGROUND

The disclosure relates generally to trusted execution environments and more specifically to debugging a microservice in a trusted execution environment.

Cyberattacks on entities (e.g., enterprises, companies, businesses, organizations, institutions, agencies, and the like) are increasing and data regulatory agencies are imposing fines on entities that do not secure their sensitive user data. As a result, breaches of sensitive user data by internal and external threats can result in financial penalties and regulatory scrutiny. Hardware-based access controls and workload isolation can provide entities confidence that their sensitive user data will not be vulnerable to breaches by insider threats or external parties in contrast to traditional software-based approaches.

Trusted execution environments are hardware-based solutions designed to protect data with regard to confidentiality and integrity by providing a secure runtime environment for applications corresponding to services or microservices. Confidential computing technology isolates sensitive user data in a trusted execution environment (i.e., a secure protected processor enclave) during processing. A trusted execution environment can exist on a separate processor, directly on a main processor of a computer system, or on a die of a multiprocessor chip. The contents of the protected processor enclave, which include the data being processed and the techniques used to process the data, are accessible only to authorized application codes.

The trusted execution environment is secured using embedded encryption keys. Embedded attestation mechanisms ensure that the encryption keys are accessible to authorized application code only. If malware or other unauthorized code attempts to access the encryption keys, or if the authorized application code is hacked or altered in any way, the trusted execution environment denies access to the encryption keys and cancels the computation process.

SUMMARY

According to one illustrative embodiment, a computer-implemented method for trusted execution environment microservice debugging is provided. A computer, utilizing a debugger server within a trusted execution environment, performs a debug operation on a microservice while running in the trusted execution environment based on a set of microservice debug messages received from a client device of a user. The computer, utilizing the debugger server within the trusted execution environment, sends a microservice debug result of performing the debug operation on the microservice while running in the trusted execution environment to a debugger client within a privilege separation container outside the trusted execution environment via a secure channel between a privilege separation secure channel client within the trusted execution environment and a privilege separation secure channel server within the privilege separation container outside the trusted execution environment. The computer, utilizing the debugger client within the privilege separation container outside the trusted execution environment, sends the microservice debug result of performing the debug operation on the microservice while running in the trusted execution environment to the client device of the user. According to other illustrative embodiments, a computer system and computer program product for trusted execution environment microservice debugging are provided.

DETAILED DESCRIPTION

Figure 1:
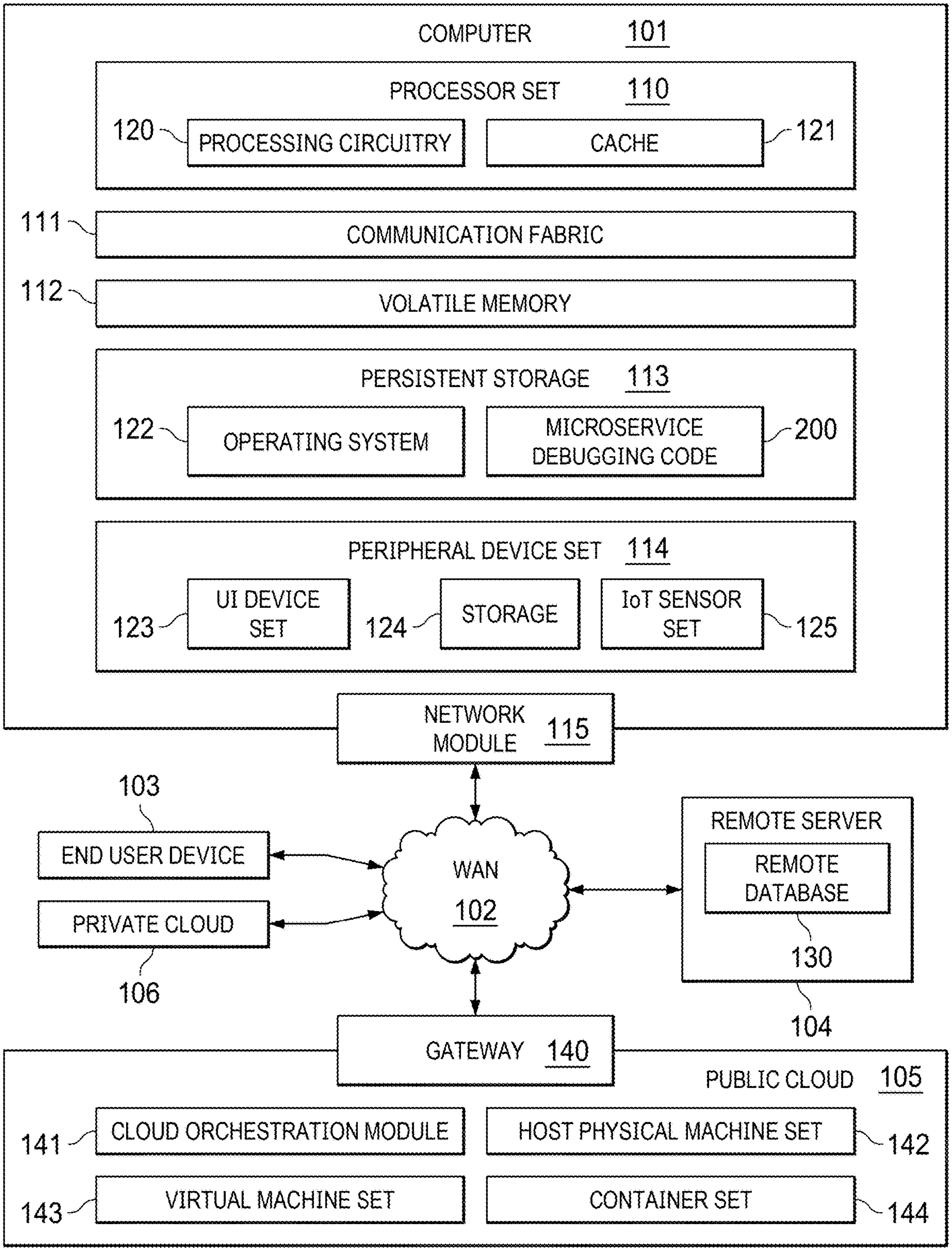
FIG. 1 is a pictorial representation of a computing environment in which illustrative embodiments may be implemented.

A computer-implemented method provides trusted execution environment microservice debugging. A computer, utilizing a debugger server within a trusted execution environment, performs a debug operation on a microservice while running in the trusted execution environment based on a set of microservice debug messages received from a client device of a user. The computer, utilizing the debugger server within the trusted execution environment, sends a microservice debug result of performing the debug operation on the microservice while running in the trusted execution environment to a debugger client within a privilege separation container outside the trusted execution environment via a secure channel between a privilege separation secure channel client within the trusted execution environment and a privilege separation secure channel server within the privilege separation container outside the trusted execution environment. The computer, utilizing the debugger client within the privilege separation container outside the trusted execution environment, sends the microservice debug result of performing the debug operation on the microservice while running in the trusted execution environment to the client device of the user. As a result, illustrative embodiments provide a technical effect of performing real time debugging of a microservice that is running inside a trusted execution environment increasing security of sensitive user data generated by the microservice.

Also, the computer utilizes the debugger client within the privilege separation container outside the trusted execution environment to receive the set of microservice debug messages from the client device of the user to debug the microservice while running in the trusted execution environment. The set of debug messages includes at least one of debugging information entries, command debug request packets, and command debug reply packets. The computer, utilizing the debugger client within the privilege separation container outside the trusted execution environment, sends the set of microservice debug messages received from the client device of the user to debug the microservice to the debugger server within the trusted execution environment via the secure channel between the privilege separation secure channel server within the privilege separation container outside the trusted execution environment and the privilege separation secure channel client within the trusted execution environment. As a result, illustrative embodiments provide a technical effect of securely sending microservice debug messages received from a client device of a user to debug a microservice to a debugger server within the trusted execution environment via a secure channel between a privilege separation secure channel server within a privilege separation container outside the trusted execution environment and a privilege separation secure channel client within the trusted execution environment.

In addition, the computer receives an input to start the trusted execution environment within a processor of the computer. The computer starts the trusted execution environment within the processor of the computer in response to receiving the input. The computer, using the trusted execution environment, starts the microservice deployed in the trusted execution environment in response to starting the trusted execution environment. As a result, illustrative embodiments provide a technical effect of starting the trusted execution environment within a processor of a computer in response to receiving an input to start the trusted execution environment and starting a microservice deployed in the trusted execution environment in response to starting the trusted execution environment.

Further, the computer, using the trusted execution environment, starts the privilege separation secure channel client within the trusted execution environment in response to starting the microservice. The computer starts the privilege separation container on the computer outside the trusted execution environment in response to starting the privilege separation secure channel client within the trusted execution environment. The computer, using the privilege separation container outside the trusted execution environment, starts the privilege separation secure channel server within the privilege separation container in response to starting the privilege separation container outside the trusted execution environment. As a result, illustrative embodiments provide a technical effect of starting a privilege separation secure channel client within the trusted execution environment in response to starting a microservice, starting a privilege separation container on the computer outside the trusted execution environment in response to starting the privilege separation secure channel client within the trusted execution environment, and starting a privilege separation secure channel server within the privilege separation container using the privilege separation container outside the trusted execution environment in response to starting the privilege separation container.

Furthermore, the computer, using the privilege separation secure channel client within the trusted execution environment, monitors an internet protocol address and port number of the privilege separation secure channel server within the privilege separation container outside the trusted execution environment. The computer, using the privilege separation secure channel client within the trusted execution environment, determines whether the privilege separation secure channel server within the privilege separation container outside the trusted execution environment is available for a new connection based on monitoring the internet protocol address and the port number of the privilege separation secure channel server. In response to the computer determining, using the privilege separation secure channel client within the trusted execution environment, that the privilege separation secure channel server within the privilege separation container outside the trusted execution environment is available for the new connection based on monitoring the internet protocol address and the port number of the privilege separation secure channel server, the computer, using the privilege separation secure channel client within the trusted execution environment, establishes the new connection with the privilege separation secure channel server within the privilege separation container outside the trusted execution environment via the internet protocol address and the port number of the privilege separation secure channel server. As a result, illustrative embodiments provide a technical effect of establishing a new connection with the privilege separation secure channel server within the privilege separation container outside the trusted execution environment via the internet protocol address and the port number of the privilege separation secure channel server in response to determining that the privilege separation secure channel server within the privilege separation container outside the trusted execution environment is available for the new connection based on monitoring the internet protocol address and the port number of the privilege separation secure channel server.

Moreover, the computer, using the privilege separation secure channel client within the trusted execution environment, performs public key infrastructure authentication to verify that the privilege separation secure channel server within the privilege separation container outside the trusted execution environment is valid in response to establishing the new connection with the privilege separation secure channel server. The computer, using the privilege separation secure channel client within the trusted execution environment, determines whether the privilege separation secure channel server within the privilege separation container outside the trusted execution environment is valid based on the public key infrastructure authentication. As a result, illustrative embodiments provide a technical effect of determining whether a privilege separation secure channel server within a privilege separation container outside the trusted execution environment is valid based on public key infrastructure authentication.

In addition, in response to the computer determining, using the privilege separation secure channel client within the trusted execution environment, that the privilege separation secure channel server within the privilege separation container outside the trusted execution environment is not valid based on the public key infrastructure authentication, the computer, using the privilege separation secure channel client within the trusted execution environment, closes the new connection with the privilege separation secure channel server within the privilege separation container outside the trusted execution environment. As a result, illustrative embodiments provide a technical effect of closing a new connection with a privilege separation secure channel server within a privilege separation container outside the trusted execution environment in response to determining that the privilege separation secure channel server within the privilege separation container outside the trusted execution environment is not valid based on public key infrastructure authentication.

Further, in response to the computer determining, using the privilege separation secure channel client within the trusted execution environment, that the privilege separation secure channel server within the privilege separation container outside the trusted execution environment is valid based on the public key infrastructure authentication, the computer, using the privilege separation secure channel client within the trusted execution environment, establishes the secure channel with the privilege separation secure channel server within the privilege separation container outside the trusted execution environment. The computer, using the privilege separation secure channel client within the trusted execution environment, launches the debugger server within the trusted execution environment in response to establishing the secure channel with the privilege separation secure channel server within the privilege separation container outside the trusted execution environment. As a result, illustrative embodiments provide a technical effect of launching a debugger server within the trusted execution environment in response to establishing a secure channel with a privilege separation secure channel server within a privilege separation container outside the trusted execution environment when it is determined that the privilege separation secure channel server within the privilege separation container outside the trusted execution environment is valid based on public key infrastructure authentication.

Furthermore, the computer, using the privilege separation secure channel client within the trusted execution environment, directs the debugger server within the trusted execution environment to attach to the microservice running in the trusted execution environment. The computer, using the privilege separation secure channel server within the privilege separation container outside the trusted execution environment, launches the debugger client within the privilege separation container outside the trusted execution environment in response to the debugger server within the trusted execution environment attaching to the microservice running in the trusted execution environment. As a result, illustrative embodiments provide a technical effect of launching a debugger client within a privilege separation container outside the trusted execution environment in response to a debugger server within the trusted execution environment attaching to a microservice running in the trusted execution environment.

Moreover, the computer, utilizing the privilege separation secure channel client within the trusted execution environment, inspects the set of microservice debug messages received from the client device of the user to verify that the set of microservice debug messages are valid messages. The computer, utilizing the privilege separation secure channel client within the trusted execution environment, allows the set of microservice debug messages received from the client device of the user to debug the microservice to pass to the debugger server within the trusted execution environment in response to verifying that the set of microservice debug messages are valid messages. As a result, illustrative embodiments provide a technical effect of allowing microservice debug messages received from a client device of a user to debug a microservice to pass to a debugger server within the trusted execution environment in response to verifying that the microservice debug messages are valid messages.

A computer system for trusted execution environment microservice debugging comprises a communication fabric, a set of computer-readable storage media connected to the communication fabric, where the set of computer-readable storage media collectively stores program instructions, and a set of processors connected to the communication fabric, where the set of processors executes the program instructions. The computer system, utilizing a debugger server within a trusted execution environment, performs a debug operation on a microservice while running in the trusted execution environment based on a set of microservice debug messages received from a client device of a user. The computer system, utilizing the debugger server within the trusted execution environment, sends a microservice debug result of performing the debug operation on the microservice while running in the trusted execution environment to a debugger client within a privilege separation container outside the trusted execution environment via a secure channel between a privilege separation secure channel client within the trusted execution environment and a privilege separation secure channel server within the privilege separation container outside the trusted execution environment. The computer system, utilizing the debugger client within the privilege separation container outside the trusted execution environment, sends the microservice debug result of performing the debug operation on the microservice while running in the trusted execution environment to the client device of the user. As a result, illustrative embodiments provide a technical effect of performing real time debugging of a microservice that is running inside a trusted execution environment increasing security of sensitive user data generated by the microservice.

Also, the computer system utilizes the debugger client within the privilege separation container outside the trusted execution environment to receive the set of microservice debug messages from the client device of the user to debug the microservice while running in the trusted execution environment. The set of debug messages includes at least one of debugging information entries, command debug request packets, and command debug reply packets. The computer system, utilizing the debugger client within the privilege separation container outside the trusted execution environment, sends the set of microservice debug messages received from the client device of the user to debug the microservice to the debugger server within the trusted execution environment via the secure channel between the privilege separation secure channel server within the privilege separation container outside the trusted execution environment and the privilege separation secure channel client within the trusted execution environment. As a result, illustrative embodiments provide a technical effect of securely sending microservice debug messages received from a client device of a user to debug a microservice to a debugger server within the trusted execution environment via a secure channel between a privilege separation secure channel server within a privilege separation container outside the trusted execution environment and a privilege separation secure channel client within the trusted execution environment.

In addition, the computer system receives an input to start the trusted execution environment within a processor of the set of processors. The computer system starts the trusted execution environment within the processor of the set of processors in response to receiving the input. The computer system, using the trusted execution environment, starts the microservice deployed in the trusted execution environment in response to starting the trusted execution environment. As a result, illustrative embodiments provide a technical effect of starting the trusted execution environment within a processor of a set of processors in response to receiving an input to start the trusted execution environment and starting a microservice deployed in the trusted execution environment in response to starting the trusted execution environment.

Further, the computer system, using the trusted execution environment, starts the privilege separation secure channel client within the trusted execution environment in response to starting the microservice. The computer system starts the privilege separation container on the computer system outside the trusted execution environment in response to starting the privilege separation secure channel client within the trusted execution environment. The computer system, using the privilege separation container outside the trusted execution environment, starts the privilege separation secure channel server within the privilege separation container in response to starting the privilege separation container outside the trusted execution environment. As a result, illustrative embodiments provide a technical effect of starting a privilege separation secure channel client within the trusted execution environment in response to starting a microservice, starting a privilege separation container on the computer outside the trusted execution environment in response to starting the privilege separation secure channel client within the trusted execution environment, and starting a privilege separation secure channel server within the privilege separation container using the privilege separation container outside the trusted execution environment in response to starting the privilege separation container.

Furthermore, the computer system, using the privilege separation secure channel client within the trusted execution environment, monitors an internet protocol address and port number of the privilege separation secure channel server within the privilege separation container outside the trusted execution environment. The computer system, using the privilege separation secure channel client within the trusted execution environment, determines whether the privilege separation secure channel server within the privilege separation container outside the trusted execution environment is available for a new connection based on monitoring the internet protocol address and the port number of the privilege separation secure channel server. The computer system, using the privilege separation secure channel client within the trusted execution environment, establishes the new connection with the privilege separation secure channel server within the privilege separation container outside the trusted execution environment via the internet protocol address and the port number of the privilege separation secure channel server in response to determining that the privilege separation secure channel server within the privilege separation container outside the trusted execution environment is available for the new connection based on monitoring the internet protocol address and the port number of the privilege separation secure channel server. As a result, illustrative embodiments provide a technical effect of establishing a new connection with the privilege separation secure channel server within the privilege separation container outside the trusted execution environment via the internet protocol address and the port number of the privilege separation secure channel server in response to determining that the privilege separation secure channel server within the privilege separation container outside the trusted execution environment is available for the new connection based on monitoring the internet protocol address and the port number of the privilege separation secure channel server.

A computer program product for trusted execution environment microservice debugging comprises a set of computer-readable storage media having program instructions collectively stored therein, the program instructions executable by a computer. The computer, utilizing a debugger server within a trusted execution environment, performs a debug operation on a microservice while running in the trusted execution environment based on a set of microservice debug messages received from a client device of a user. The computer, utilizing the debugger server within the trusted execution environment, sends a microservice debug result of performing the debug operation on the microservice while running in the trusted execution environment to a debugger client within a privilege separation container outside the trusted execution environment via a secure channel between a privilege separation secure channel client within the trusted execution environment and a privilege separation secure channel server within the privilege separation container outside the trusted execution environment. The computer, utilizing the debugger client within the privilege separation container outside the trusted execution environment, sends the microservice debug result of performing the debug operation on the microservice while running in the trusted execution environment to the client device of the user. As a result, illustrative embodiments provide a technical effect of performing real time debugging of a microservice that is running inside a trusted execution environment increasing security of sensitive user data generated by the microservice.

Also, the computer utilizes the debugger client within the privilege separation container outside the trusted execution environment to receive the set of microservice debug messages from the client device of the user to debug the microservice while running in the trusted execution environment. The set of debug messages includes at least one of debugging information entries, command debug request packets, and command debug reply packets. The computer, utilizing the debugger client within the privilege separation container outside the trusted execution environment, sends the set of microservice debug messages received from the client device of the user to debug the microservice to the debugger server within the trusted execution environment via the secure channel between the privilege separation secure channel server within the privilege separation container outside the trusted execution environment and the privilege separation secure channel client within the trusted execution environment. As a result, illustrative embodiments provide a technical effect of securely sending microservice debug messages received from a client device of a user to debug a microservice to a debugger server within the trusted execution environment via a secure channel between a privilege separation secure channel server within a privilege separation container outside the trusted execution environment and a privilege separation secure channel client within the trusted execution environment.

In addition, the computer receives an input to start the trusted execution environment within a processor of the computer. The computer starts the trusted execution environment within the processor of the computer in response to receiving the input. The computer, using the trusted execution environment, starts the microservice deployed in the trusted execution environment in response to starting the trusted execution environment. As a result, illustrative embodiments provide a technical effect of starting the trusted execution environment within a processor of a computer in response to receiving an input to start the trusted execution environment and starting a microservice deployed in the trusted execution environment in response to starting the trusted execution environment.

Further, the computer, using the trusted execution environment, starts the privilege separation secure channel client within the trusted execution environment in response to starting the microservice. The computer starts the privilege separation container on the computer outside the trusted execution environment in response to starting the privilege separation secure channel client within the trusted execution environment. The computer, using the privilege separation container outside the trusted execution environment, starts the privilege separation secure channel server within the privilege separation container in response to starting the privilege separation container outside the trusted execution environment. As a result, illustrative embodiments provide a technical effect of starting a privilege separation secure channel client within the trusted execution environment in response to starting a microservice, starting a privilege separation container on the computer outside the trusted execution environment in response to starting the privilege separation secure channel client within the trusted execution environment, and starting a privilege separation secure channel server within the privilege separation container using the privilege separation container outside the trusted execution environment in response to starting the privilege separation container.

Furthermore, the computer, using the privilege separation secure channel client within the trusted execution environment, monitors an internet protocol address and port number of the privilege separation secure channel server within the privilege separation container outside the trusted execution environment. The computer, using the privilege separation secure channel client within the trusted execution environment, determines whether the privilege separation secure channel server within the privilege separation container outside the trusted execution environment is available for a new connection based on monitoring the internet protocol address and the port number of the privilege separation secure channel server. The computer, using the privilege separation secure channel client within the trusted execution environment, establishes the new connection with the privilege separation secure channel server within the privilege separation container outside the trusted execution environment via the internet protocol address and the port number of the privilege separation secure channel server in response to determining that the privilege separation secure channel server within the privilege separation container outside the trusted execution environment is available for the new connection based on monitoring the internet protocol address and the port number of the privilege separation secure channel server. As a result, illustrative embodiments provide a technical effect of establishing a new connection with the privilege separation secure channel server within the privilege separation container outside the trusted execution environment via the internet protocol address and the port number of the privilege separation secure channel server in response to determining that the privilege separation secure channel server within the privilege separation container outside the trusted execution environment is available for the new connection based on monitoring the internet protocol address and the port number of the privilege separation secure channel server.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
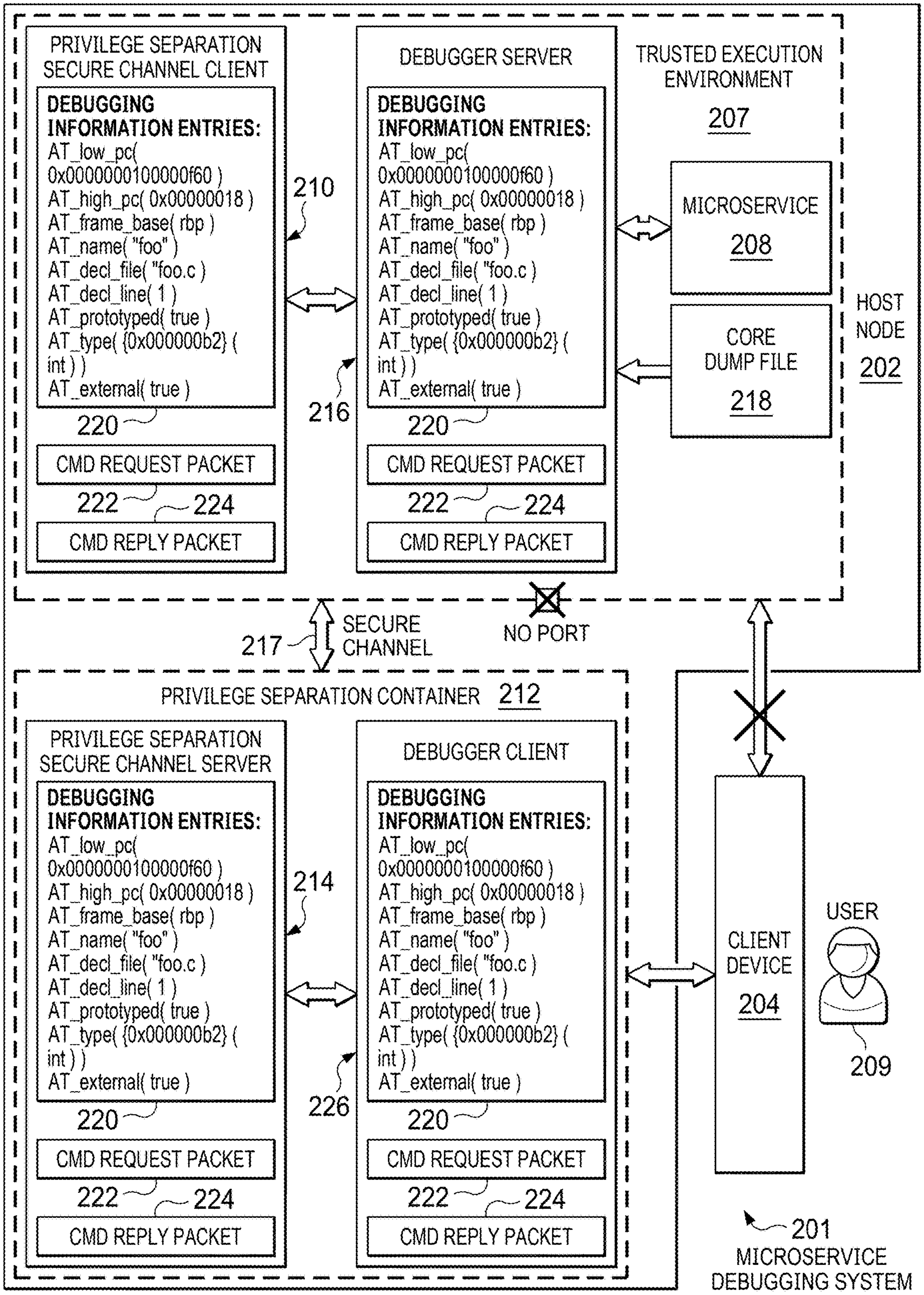
FIG. 2 is a diagram illustrating an example of a microservice debugging system in accordance with an illustrative embodiment.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of a container-based environment (e.g., Kubernetes® a registered trademark of the Linux Foundation of San Francisco, CA, USA) for the execution of at least some of the computer code involved in performing the inventive methods of illustrative embodiments, such as microservice debugging code 200. For example, microservice debugging code 200 securely performs debugging of a microservice that is hosted in a trusted execution environment with restricted access. Microservice debugging code 200 utilize a client/server approach to perform debugging of the microservice in the trusted execution environment. Microservice debugging code 200 inserts a privilege separation secure channel client in the trusted execution environment and provides a privilege separation container, which includes a privilege separation secure channel server, outside the trusted execution environment. Microservice debugging code 200 utilizes the privilege separation secure channel client in the trusted execution environment and the privilege separation secure channel server outside the trusted execution environment to establish a secure communication connection between the target microservice and a client device user to perform real time or live debugging of the that microservice while running in the trusted execution environment. This client/server approach prevents potential security threats arising from enabling a remote login to the privilege separation secure channel client in the trusted execution environment. Microservice debugging code 200 utilizes public key infrastructure authentication to establish a secure channel between the privilege separation secure channel client in the trusted execution environment and the privilege separation secure channel server outside the trusted execution environment. As a result, the privilege separation secure channel server outside the trusted execution environment is isolated from the microservice data, increasing security of sensitive user data generated by the microservice.

In addition to microservice debugging code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and microservice debugging code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. In addition, processor set 110 also includes the trusted execution environment within a processor. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in microservice debugging code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102.

Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a program developer utilizing the microservice debugging services provided by computer 101), and may take any of the forms discussed above in connection with computer 101. EUD 103 typically receives helpful and useful data from the operations of computer 101. For example, in a hypothetical case where computer 101 is designed to provide microservice debugging results information to the end user, this information would typically be communicated from network module 115 of computer 101 through WAN 102 to EUD 103. In this way, EUD 103 can display, or otherwise present, the microservice debugging results information to the end user. In some embodiments, EUD 103 may be a client device, such as a thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a microservice debugging recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Confidential computing is a data security and privacy-enhancing computational technique focused on protecting data in use (e.g., being processed). Confidential computing can also be used in conjunction with storage encryption and network encryption, which protect data at rest and data in transit, respectively. Confidential computing includes trusted execution environments, which are hardware-based solutions. A trusted execution environment is secure because all components (e.g., processor, memory, and the like) of the trusted execution environment are encrypted. Additionally, the trusted execution environment has secure shell protocol disabled, increasing security of the trusted execution environment.

For example, typically when a user deploys a microservice in a trusted execution environment, secure shell protocol is disabled. As a result, the user currently cannot debug the microservice in the trusted execution environment due to the confidential computing design of the trusted execution environment. In other words, a microservice that needs to be debugged, but is protected within a trusted execution environment, is not accessible by the user from outside the trusted execution environment. Consequently, once the user deploys the microservice within the trusted execution environment, the user currently cannot debug the microservice.

Furthermore, when the microservice fails in the trusted execution environment, the operating system typically generates a file known as a core dump file. This core dump file provides a snapshot of the microservice at the time of the failure and contains information, such as, for example, the application's execution stack, descriptors of open files, values of variables in memory, the state of registers, and the like. A user can utilize this information contained in the core dump file to determine the cause of the microservice failure. However, due to the access restrictions of the trusted execution environment, the user currently cannot extract the core dump file from the trusted execution environment, thus preventing the user from reading the core dump file to determine the cause of the microservice failure.

Confidential computing utilizes the trusted execution environment as a container runtime environment for the microservice. As a result, the user can deploy the microservice within the trusted execution environment of a host node. As the microservice operates within the trusted execution environment, the microservice can generate sensitive user data, which is stored within a virtual volume of the trusted execution environment.

Illustrative embodiments include a privilege separation secure channel client inside the trusted execution environment. The privilege separation secure channel client monitors the internet protocol address and port number of a privilege separation container outside of the trusted execution environment. In response to the privilege separation secure channel client detecting that the privilege separation container and its corresponding privilege separation secure channel server are ready and available based on monitoring the internet protocol address and port number of the privilege separation container, the privilege separation secure channel client establishes a connection with the privilege separation secure channel server located in the privilege separation container.

In response to the privilege separation secure channel client establishing the connection with the privilege separation secure channel server, the privilege separation secure channel client verifies the identity of the privilege separation secure channel server as a valid server. The privilege separation secure channel client utilizes public key infrastructure authentication to verify the identity of the privilege separation secure channel server as a valid server. In response to the privilege separation secure channel client verifying the identity of the privilege separation secure channel server, the privilege separation secure channel client establishes a secure channel with the privilege separation secure channel server. In response to the privilege separation secure channel client establishing the secure channel with the privilege separation secure channel server, the privilege separation secure channel client launches a debugger server inside the trusted execution environment.

It should be noted that when a compiler compiles a programming language (e.g., C, C++, or the like) into machine code, the resulting binary executable contains not only the actual instructions for the processor, but also additional information that helps the debugger understand the relationship between the original source code and the compiled machine code. This extra information is known as debugging information. Debugging information is a representation of the relationship between the executable machine code of the microservice/application and the original source code.

Debugging information entries output by compilers are basic descriptive entities within the debugging information that provide a low-level description of the compiled source code. One debugging information entry represents a specific piece of information related to the program. Each debugging information entry consists of an identifying tag and various attributes that relay information about the program being represented.

Debugging information entries are interconnected through sibling and child links, allowing the debugging information entries to reference each other. Debugging information entries provide a bridge between the compiled machine code and the original source code. Debugging information entries help the debugger map machine instructions back to specific lines of the source code. For example, when a user sets a breakpoint in the debugger to stop execution at a specific function entry, the debugger uses the debugging information entries to find the corresponding machine code address for that specific function. When inspecting a variable's value during debugging, the debugger relies on the debugging information entries to locate the corresponding memory location associated with that variable. In other words, debugging information entries enable effective debugging by connecting the low-level machine code with the high-level source code, thus allowing the debugger to navigate and interpret the program's behavior during debugging sessions.

After the privilege separation secure channel client launches the debugger server inside the trusted execution environment, the privilege separation secure channel client directs the debugger server to attach to the microservice in preparation for subsequent debugging or to read a core dump file corresponding to the microservice after failure. Further, the privilege separation secure channel client manages the sending and receiving of a set of debug messages (e.g., including at least one of debugging information entries, command debug request packets, command debug reply packets, and the like) via the secure channel to maintain the integrity and security of the debugging information. For example, the privilege separation secure channel client inspects these debug messages as the debugging information is transmitted via the secure channel to determine whether debug messages received by the privilege separation secure channel client from the privilege separation secure channel server are valid or not to ensure debugging information integrity and security. The command debug request packets include, for example, debugger commands such as breakpoints and the like. The command debug reply packets include responses (e.g., microservice debug information) corresponding to respective command debug request packets.

The privilege separation secure channel client sends the set of debug messages to the debugger server to debug the microservice. The debugger server receives microservice debug results of debugging the microservice and sends the microservice debug results to the privilege separation secure channel client, which in turns sends the microservice debug results to the privilege separation secure channel server via the secure channel.

The privilege separation container utilizes the privilege separation secure channel server to launch a debugger client in the privilege separation container. The debugger client located in the privilege separation container outside the trusted execution environment connects to the debugger server located inside the trusted execution environment using the secure channel established between the privilege separation secure channel client and the privilege separation secure channel server to obtain the microservice debug results of debugging the microservice. The user utilizes a client device to access the debugger client to obtain the microservice debug results of debugging the microservice. Thus, illustrative embodiments enable the user to debug the microservice in real time while running within the trusted execution environment or to read a core dump file, which is located within the trusted execution environment, corresponding to a failure of the microservice.

Moreover, because the privilege separation secure channel client is a client and not a server or service, the trusted execution environment will not open a new port and attach a new server or service to the new port, which prevents potential security threats (e.g., zero-day vulnerabilities and other common vulnerabilities and exposures) arising from enabling remote logins to the new server or service via the new port. In other words, illustrative embodiments do not expose any new ports for any new server or service for debugging, which prevents the potential of security threats inside the trusted execution environment, decreasing the risk of sensitive user data leakage from the microservice.

Thus, illustrative embodiments provide one or more technical solutions that overcome a technical problem with a current inability of a user to perform real time debugging of a microservice running in a trusted execution environment. As a result, these one or more technical solutions provide a technical effect and practical application in the field of trusted execution environments.

With reference now to FIG. 2, a diagram illustrating an example of a microservice debugging system is depicted in accordance with an illustrative embodiment. Microservice debugging system 201 may be implemented in a computing environment, such as computing environment 100 in FIG. 1. Microservice debugging system 201 is a system of hardware and software components for enabling a user to perform real time debugging of a microservice running in a trusted execution environment.

In this example, microservice debugging system 201 includes host node 202 and client device 204. Host node 202 can be, for example, computer 101 in FIG. 1. Client device 204 can be, for example, EUD 103 in FIG. 1. However, it should be noted that microservice debugging system 201 is intended to be an example only and not as a limitation on illustrative embodiments. For example, microservice debugging system 201 can include any number of host nodes, client devices, and other devices and components not shown.

Host node 202 includes trusted execution environment 207. Trusted execution environment 207 runs in a processor of host node 202. The processor can be included in a set of processors, such as, for example, processor set 110 in FIG. 1. Trusted execution environment 207 contains the runtime environment for microservice 208, which was deployed in trusted execution environment 207 by, for example, user 209. Microservice 208 can represent any type of microservice or service provided by a containerized application. User 209 may be, for example, a program developer.

In response to host node 202 starting trusted execution environment 207 and microservice 208, host node 202 starts privilege separation secure channel client 210 in trusted execution environment 207 and privilege separation container 212 outside of trusted execution environment 207. Privilege separation container 212 starts privilege separation secure channel server 214 within privilege separation container 212.

Privilege separation secure channel client 210 launches debugger server 216. Further, privilege separation secure channel client 210 directs debugger server 216 to attach to microservice 208 for subsequent debugging. Alternatively, if microservice 208 fails and the operating system of host node 202 generates core dump file 218, then privilege separation secure channel client 210 can direct debugger server 216 to read core dump file 218.

Trusted execution environment 207 utilizes privilege separation secure channel client 210 to manage and filter all messages (i.e., debugging information entries 220, command debug request packets 222, command debug reply packets 224, and the like) from privilege separation secure channel server 214 via secure channel 217. Privilege separation secure channel client 210 utilizes public key infrastructure authentication to verify validity of privilege separation secure channel server 214.

Privilege separation secure channel server 214 launches debugger client 226 within privilege separation container 212 outside of trusted execution environment 207. Debugger client 226 interfaces with user 209 via client device 204. User 209 sends microservice debug messages to debug microservice 208 to debugger client 226 using client device 204. Debugger client 226 sends the microservice debug messages to debugger server 216 to debug microservice 208 via privilege separation secure channel server 214 and privilege separation secure channel client 210 using secure channel 217.

Debugger server 216 sends results of debugging microservice 208 to debugger client 226 via privilege separation secure channel client 210 and privilege separation secure channel server 214 using secure channel 217. Then, debugger client 226 sends the microservice debug results to user 209 via client device 204. As a result, user 209 can debug microservice 208 in real time while microservice 208 is running within trusted execution environment 207. It should be noted that user 209 cannot directly access microservice 208 within trusted execution environment 207 to debug microservice 208. Similarly, a malicious user cannot access microservice 208 within trusted execution environment 207 to misappropriate sensitive user data from microservice 208.

Figure 3:
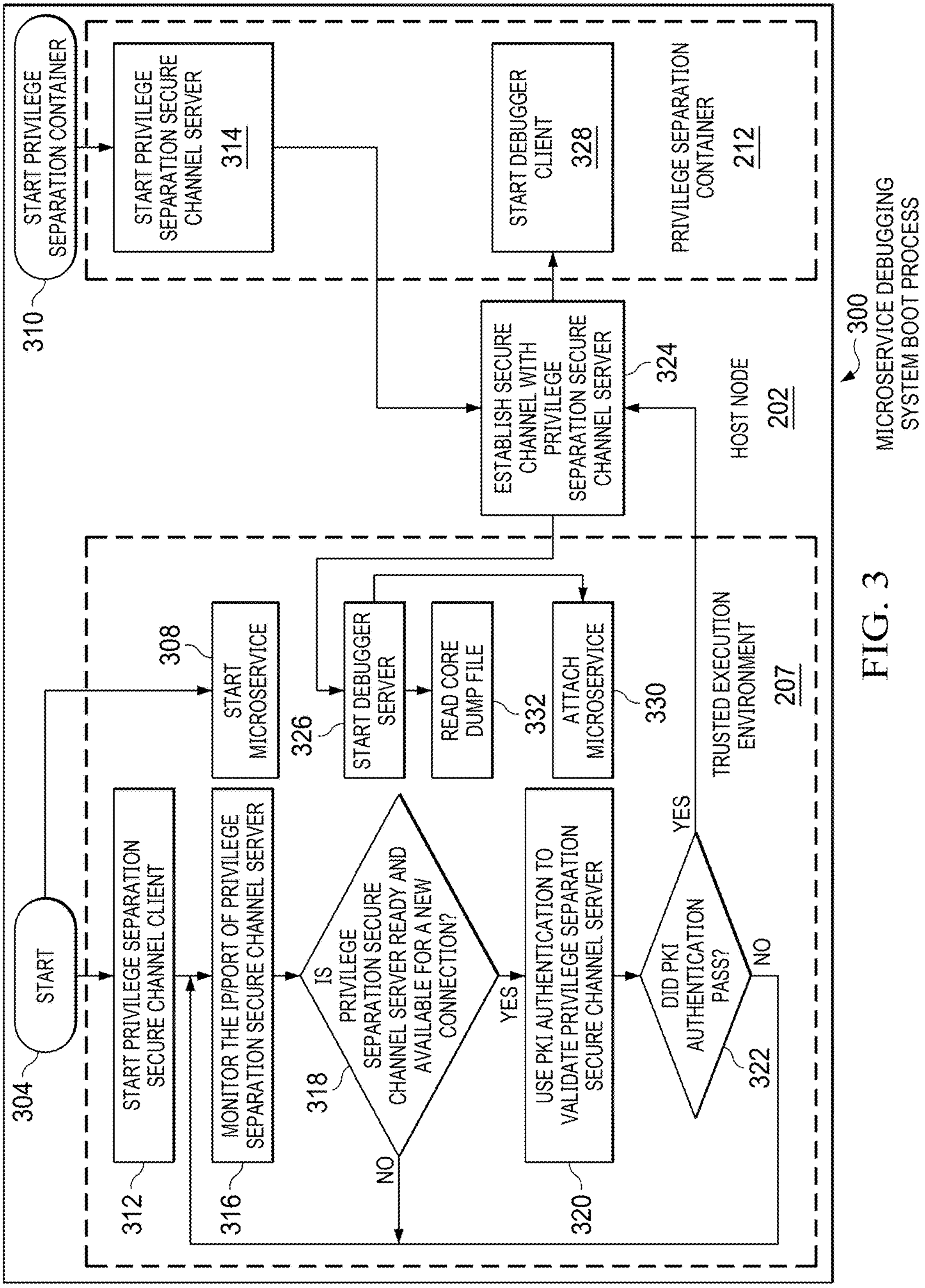
FIG. 3 is a diagram illustrating an example of a microservice debugging system boot process in accordance with an illustrative embodiment.

With reference now to FIG. 3, a diagram illustrating an example of a microservice debugging system boot process is depicted in accordance with an illustrative embodiment. Microservice debugging system boot process 300 is implemented in host node 202.

At 304, host node 202 starts trusted execution environment 207. In addition, at 308, host node 202 starts a microservice in trusted execution environment 207. Further, at 310, host node 202 starts privilege separation container 212 outside of trusted execution environment 207. Furthermore, at 312, host node 202 starts a privilege separation secure channel client in trusted execution environment 207. Moreover, at 314, host node 202 starts a privilege separation secure channel server within privilege separation container 212.

At 316, host node 202 monitors the internet protocol address and port number of the privilege separation secure channel server within privilege separation container 212 outside of trusted execution environment 207 using the privilege separation secure channel client within trusted execution environment 207. At 318, host node 202 determines whether the privilege separation secure channel server is ready and available for a new connection based on the monitoring. If the privilege separation secure channel server is not ready and available for a new connection based on the monitoring, then host node 202 continues to monitor the internet protocol address and port number of the privilege separation secure channel server. If the privilege separation secure channel server is ready and available for a new connection based on the monitoring, then, at 320, host node 202 uses public key infrastructure authentication to validate the privilege separation secure channel server.

At 322, host node 202 determines whether the public key infrastructure authentication passed. If the public key infrastructure authentication did not pass, then host node 202 continues to monitor the internet protocol address and port number of the privilege separation secure channel server. It should be noted that this is a loop to ensure security. In practice, both trusted execution environment 207 and privilege separation container 212 operate in secure environments, making authentication failures rare. If the public key infrastructure authentication did pass, then, at 324, host node 202 establishes a secure channel between the privilege separation secure channel client within trusted execution environment 207 and the privilege separation secure channel server within privilege separation container 212 outside of trusted execution environment 207.

In addition, at 326, host node 202 starts a debugger server within trusted execution environment 207. At 328, host node 202 also starts a debugger client within privilege separation container 212 outside trusted execution environment 207. At 330, host node 202 instructs the debugger server to attach to the microservice running in trusted execution environment 207 to debug the microservice. Alternatively, at 332, host node 202 instructs the debugger server to read a core dump file corresponding to the microservice after the microservice fails. It should be noted that a client device user, such as, for example, user 209 in FIG. 2, sends a set of debug messages to either debug the microservice while running in trusted execution environment 207 or to read the core dump file after the microservice fails.

Figure 4:
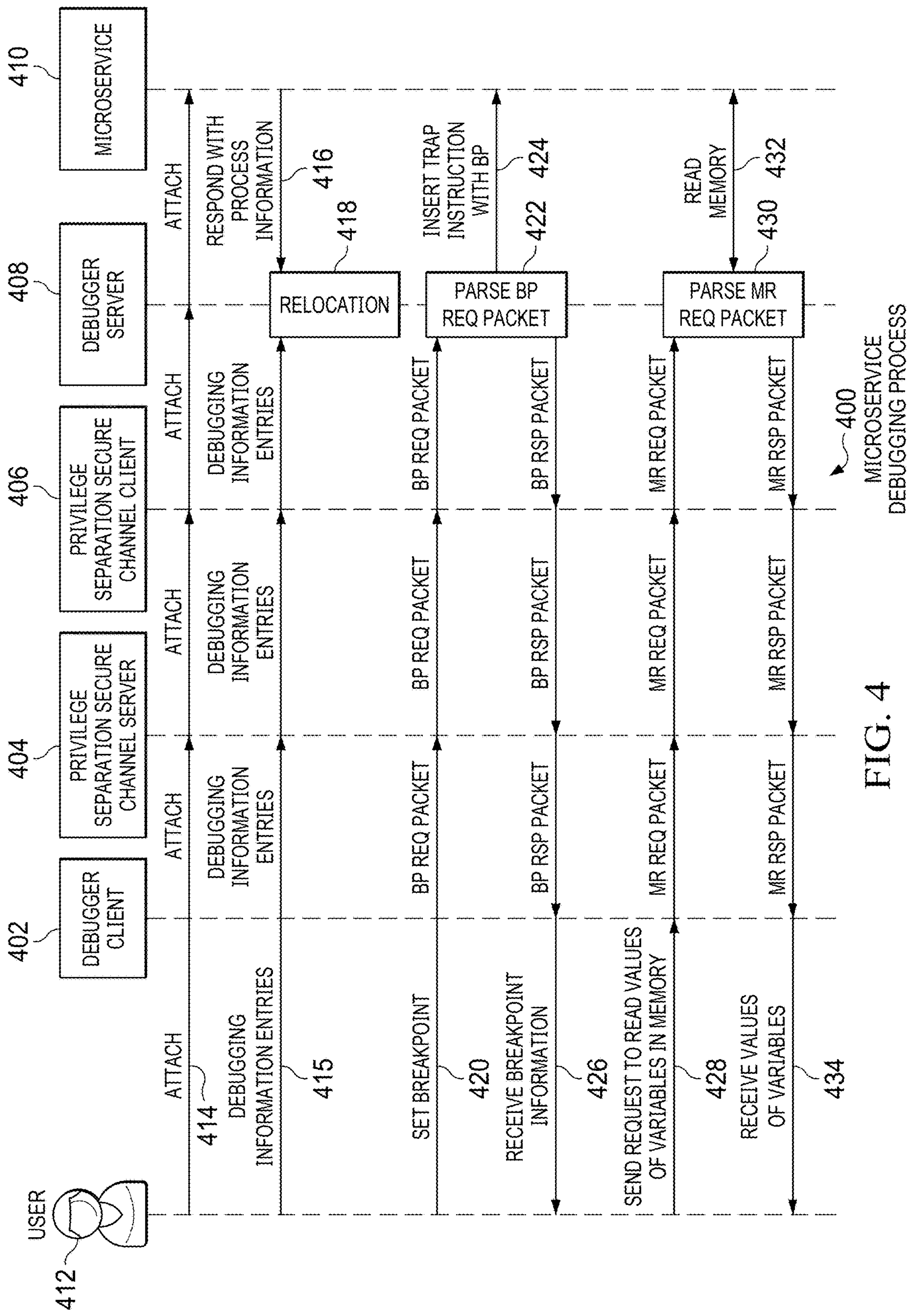
FIG. 4 is a diagram illustrating an example of a microservice debugging process in accordance with an illustrative embodiment.
Figure 5A:
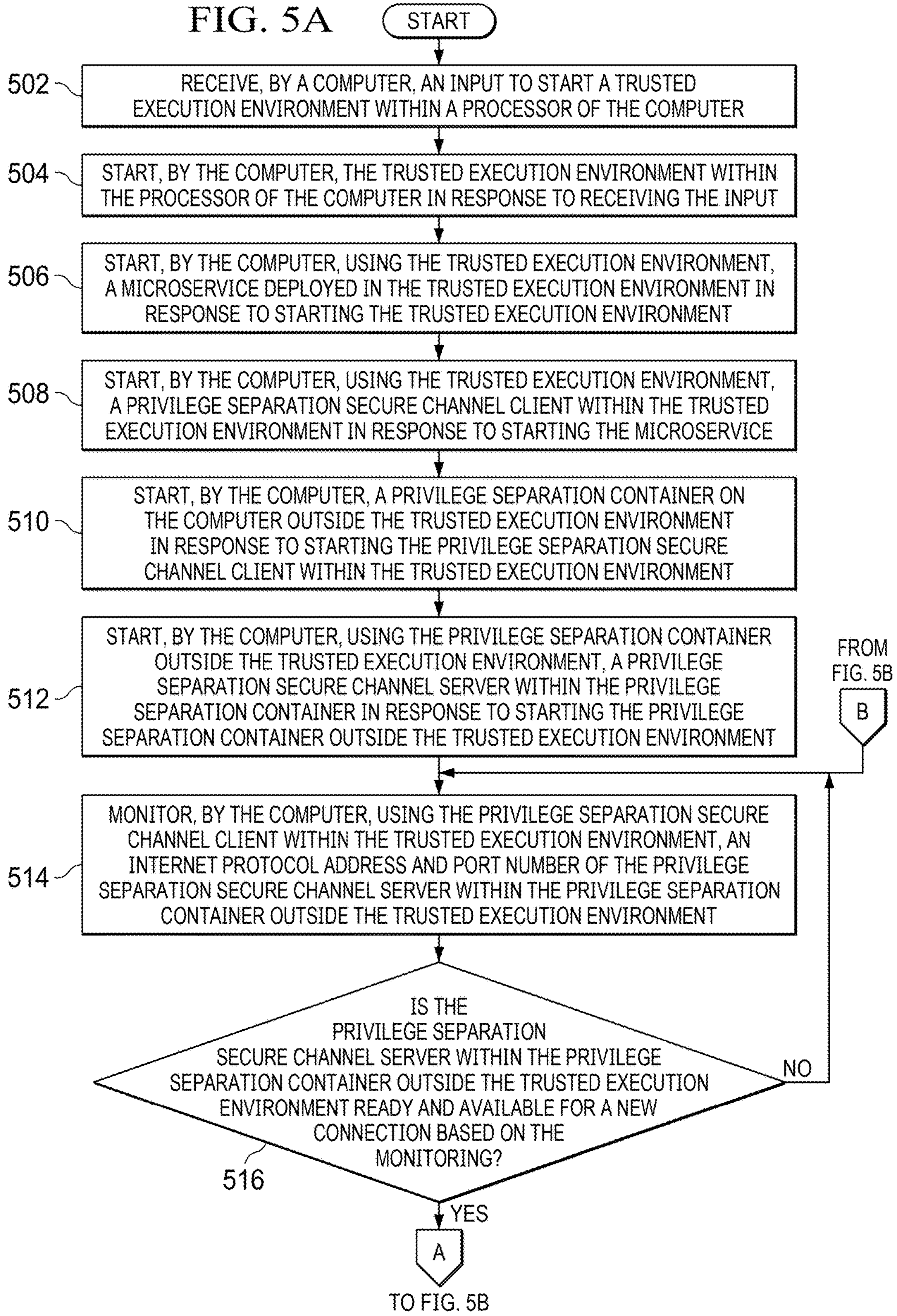
FIGS. 5A-5D are a flowchart illustrating a process for trusted execution environment microservice debugging in accordance with an illustrative embodiment.
Figure 5B:
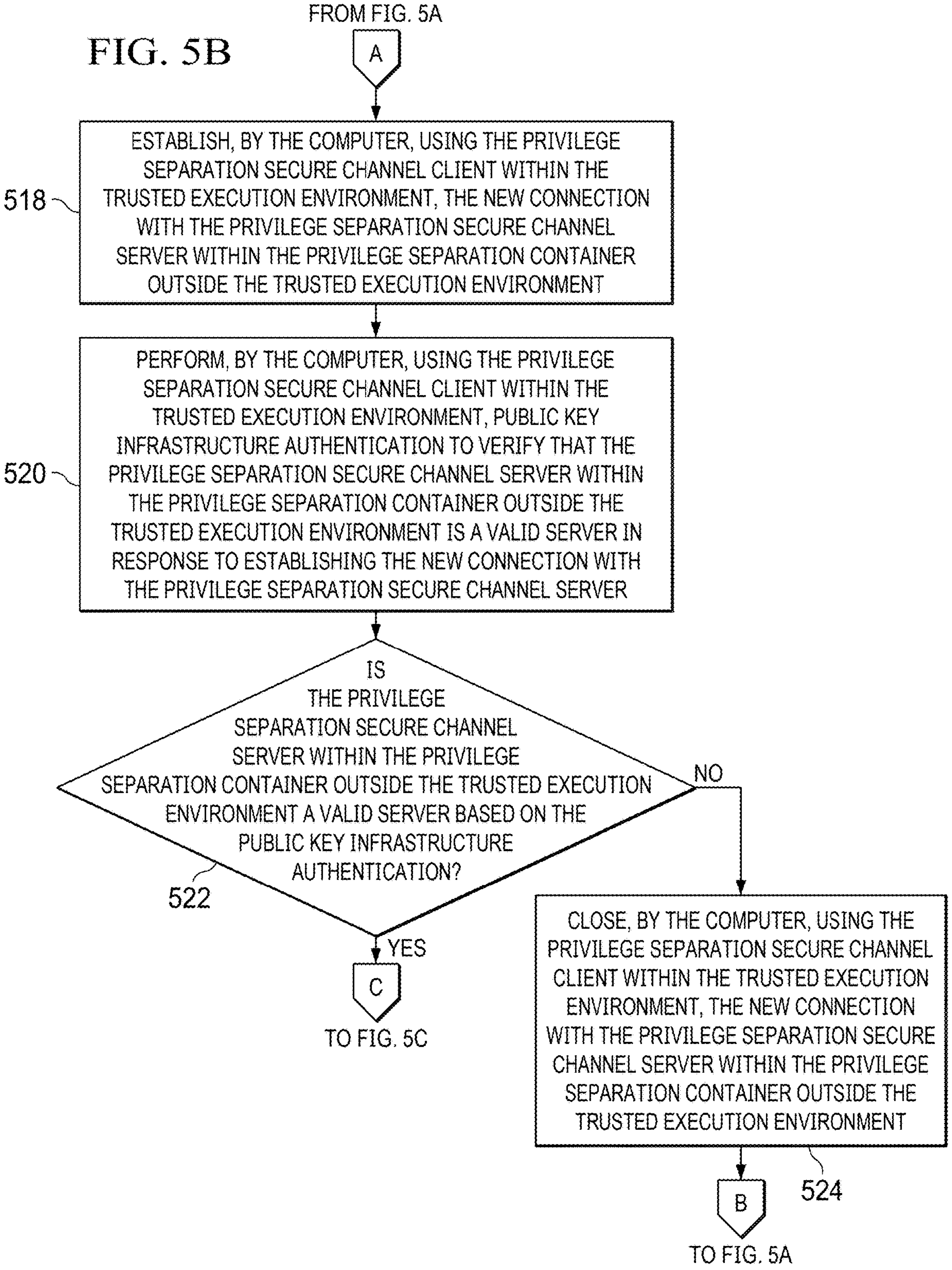
Figure 5C:
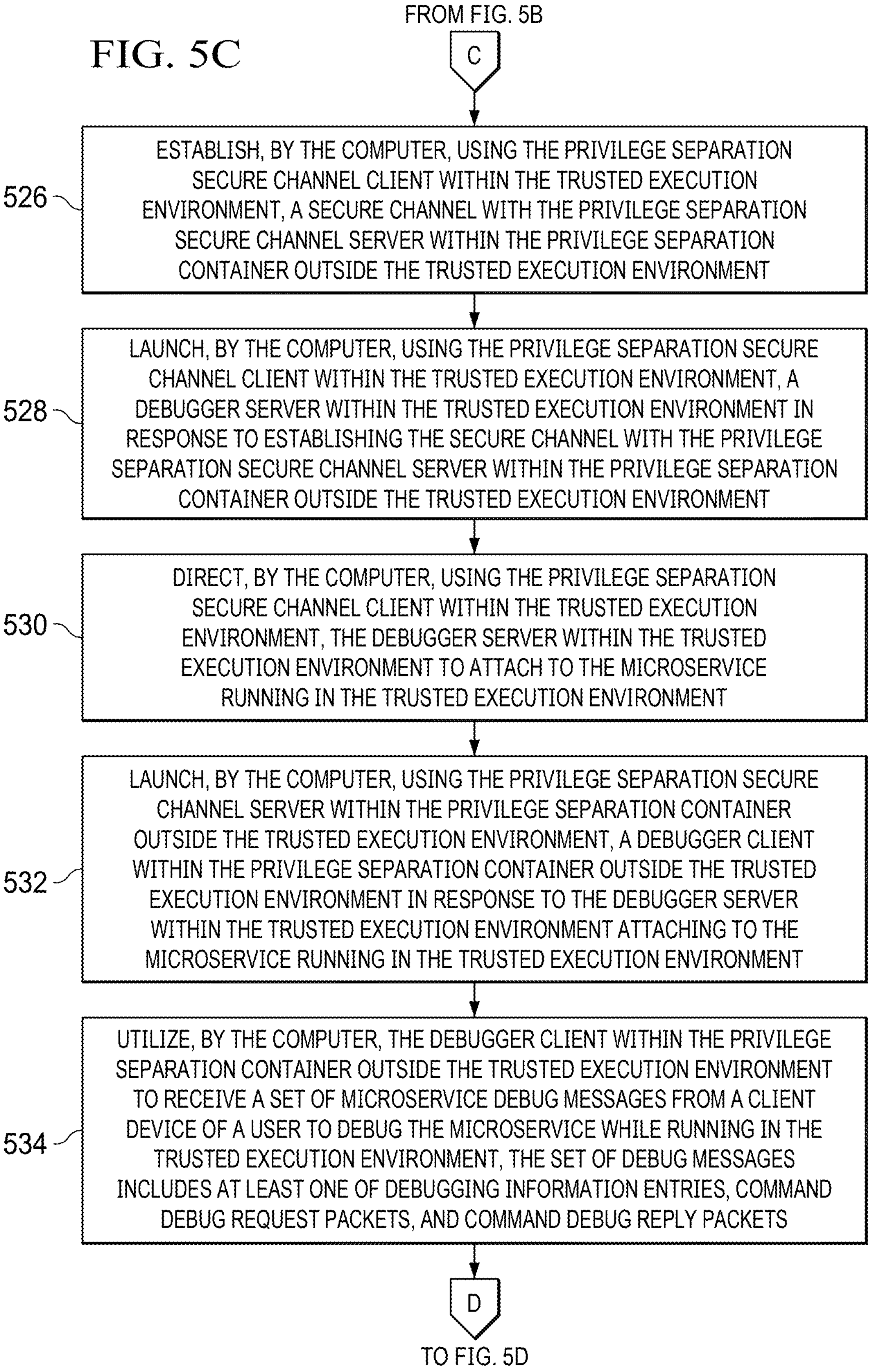
Figure 5D:
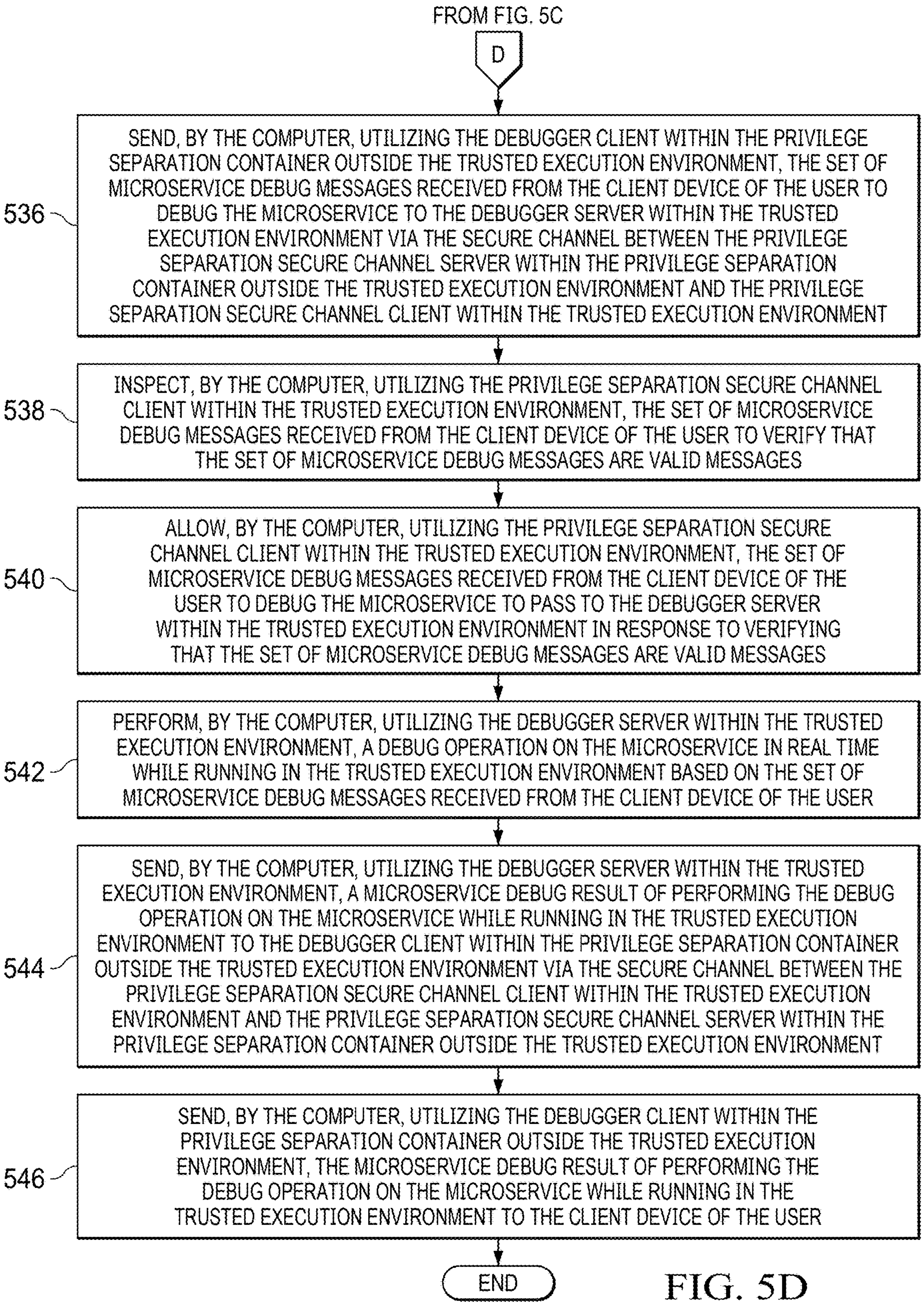

With reference now to FIG. 4, a diagram illustrating an example of a microservice debugging process is depicted in accordance with an illustrative embodiment. Microservice debugging process 400 can be implemented in, for example, microservice debugging system 201 in FIG. 2. Microservice debugging process 400 includes debugger client 402, privilege separation secure channel server 404, privilege separation secure channel client 406, debugger server 408, and microservice 410. Debugger client 402, privilege separation secure channel server 404, privilege separation secure channel client 406, debugger server 408, and microservice 410 can be, for example, debugger client 226, privilege separation secure channel server 214, privilege separation secure channel client 210, debugger server 216, and microservice 208 in FIG. 2.

Microservice debugging process 400 shows a time sequence for user 412, such as, for example, user 209 in FIG. 2, to perform debugging of microservice 410 after debugger client 402, privilege separation secure channel server 404, privilege separation secure channel client 406, debugger server 408, and microservice 410 are ready and available. At 414, user 412 operates debugger client 402 via a client device, such as, for example, client device 204 in FIG. 2, to attach debugger server 408 to microservice 410.

It should be noted that when a compiler compiles a microservice, the debug information functionality is typically enabled, generating debugging information entries. The compiler includes the debugging information entries in an executable and linkable format file of the microservice for debugging purposes. In other words, the compiler automatically generates the debugging information during compilation.

However, if the debug information functionality is not enabled during compilation of the microservice, the executable and linkable format file will not contain the debugging information entries. In such situations when the executable and linkable format file does not contain the debugging information entries, a user will need to send the debugging information entries to the debugger server. As a result, in this example, user 412, at 415, sends debugging information entries, such as, for example, debugging information entries 220 in FIG. 2, to debugger server 408 for debugging microservice 410.

At 416, in response to receiving the debug information entries, debugger server 408 retrieves process information from microservice 410. Afterward, debugger server 408 integrates the debugging information entries with the process information of microservice 410 to perform relocation 418. By performing relocation 418, debugger server 408 obtains the actual addresses of the variables and functions within microservice 410.

Afterward, at 420, user 412 sets a breakpoint in a breakpoint request packet and sends the breakpoint request packet to debugger server 408. The breakpoint is an intentional interruption, stopping, or pausing place in microservice 410 for debugging purposes. More generally, the breakpoint is a means of acquiring knowledge about execution of microservice 410. During the interruption, user 412 (e.g., a program developer) inspects, for example, general-purpose registers, memory, logs, files, and the like corresponding to microservice 410 at that point in time to determine whether microservice 410 is functioning as expected. The breakpoint consists of one or more conditions that determine when execution of microservice 410 should be interrupted.

At 422, debugger server 408 parses the breakpoint request packet to identify the breakpoint. At 424, debugger server 408 inserts a trap instruction with the breakpoint into microservice 410. At 426, user 412 receives a breakpoint response packet containing breakpoint information.

At 428, user 412 sends a request to read values of variables corresponding to microservice 410 within a memory request packet to debugger server 408. At 430, debugger server 408 parses the memory request packet to identify the variables. At 432, debugger server 408 reads the values of the variables corresponding to microservice 410 in memory. At 434, user 412 receives the values of the variables corresponding to microservice 410 within a memory response packet.

With reference now to FIGS. 5A-5D, a flowchart illustrating a process for trusted execution environment microservice debugging is shown in accordance with an illustrative embodiment. The process shown in FIGS. 5A-5D may be implemented in a computer, such as, for example, computer 101 in FIG. 1 or host node 202 in FIG. 2. For example, the process shown in FIGS. 5A-5D may be implemented by microservice debugging code 200 in FIG. 1.

The process begins when the computer receives an input to start a trusted execution environment within a processor of the computer (step 502). The computer starts the trusted execution environment within the processor of the computer in response to receiving the input (step 504). The computer, using the trusted execution environment, starts a microservice deployed in the trusted execution environment in response to starting the trusted execution environment (step 506).

The computer, using the trusted execution environment, starts a privilege separation secure channel client within the trusted execution environment in response to starting the microservice (step 508). The computer starts a privilege separation container on the computer outside the trusted execution environment in response to starting the privilege separation secure channel client within the trusted execution environment (step 510). The computer, using the privilege separation container outside the trusted execution environment, starts a privilege separation secure channel server within the privilege separation container in response to starting the privilege separation container outside the trusted execution environment (step 512).

The computer, using the privilege separation secure channel client within the trusted execution environment, monitors an internet protocol address and port number of the privilege separation secure channel server within the privilege separation container outside the trusted execution environment (step 514). The computer, using the privilege separation secure channel client within the trusted execution environment, makes a determination as to whether the privilege separation secure channel server within the privilege separation container outside the trusted execution environment is ready and available for a new connection based on monitoring the internet protocol address and port number of the privilege separation secure channel server (step 516).

If the computer, using the privilege separation secure channel client within the trusted execution environment, determines that the privilege separation secure channel server within the privilege separation container outside the trusted execution environment is not ready and available for a new connection based on monitoring the internet protocol address and port number of the privilege separation secure channel server, no output of step 516, then the process returns to step 514 where the computer, using the privilege separation secure channel client within the trusted execution environment, continues to monitor the internet protocol address and port number of the privilege separation secure channel server. If the computer, using the privilege separation secure channel client within the trusted execution environment, determines that the privilege separation secure channel server within the privilege separation container outside the trusted execution environment is ready and available for a new connection based on monitoring the internet protocol address and port number of the privilege separation secure channel server, yes output of step 516, then the computer, using the privilege separation secure channel client within the trusted execution environment, establishes the new connection with the privilege separation secure channel server within the privilege separation container outside the trusted execution environment via the internet protocol address and port number of the privilege separation secure channel server (step 518).

The computer, using the privilege separation secure channel client within the trusted execution environment, performs public key infrastructure authentication to verify that the privilege separation secure channel server within the privilege separation container outside the trusted execution environment is a valid server in response to establishing the new connection with the privilege separation secure channel server (step 520). The computer, using the privilege separation secure channel client within the trusted execution environment, makes a determination as to whether the privilege separation secure channel server within the privilege separation container outside the trusted execution environment is a valid server based on the public key infrastructure authentication (step 522).

If the computer, using the privilege separation secure channel client within the trusted execution environment, determines that the privilege separation secure channel server within the privilege separation container outside the trusted execution environment is not a valid server based on the public key infrastructure authentication, no output of step 522, then the computer, using the privilege separation secure channel client within the trusted execution environment, closes the new connection with the privilege separation secure channel server within the privilege separation container outside the trusted execution environment (step 524). Thereafter, the process returns to step 514 where the computer, using the privilege separation secure channel client within the trusted execution environment, continues to monitor the internet protocol address and port number of the privilege separation secure channel server. If the computer, using the privilege separation secure channel client within the trusted execution environment, determines that the privilege separation secure channel server within the privilege separation container outside the trusted execution environment is a valid server based on the public key infrastructure authentication, yes output of step 522, then the computer, using the privilege separation secure channel client within the trusted execution environment, establishes a secure channel with the privilege separation secure channel server within the privilege separation container outside the trusted execution environment (step 526).

The computer, using the privilege separation secure channel client within the trusted execution environment, launches a debugger server within the trusted execution environment in response to establishing the secure channel with the privilege separation secure channel server within the privilege separation container outside the trusted execution environment (step 528). Afterward, the computer, using the privilege separation secure channel client within the trusted execution environment, directs the debugger server within the trusted execution environment to attach to the microservice running in the trusted execution environment (step 530). Further, the computer, using the privilege separation secure channel server within the privilege separation container outside the trusted execution environment, launches a debugger client within the privilege separation container outside the trusted execution environment in response to the debugger server within the trusted execution environment attaching to the microservice running in the trusted execution environment (step 532).

The computer utilizes the debugger client within the privilege separation container outside the trusted execution environment to receive a set of microservice debug messages from a client device of a user to debug the microservice while running in the trusted execution environment (step 534). The set of debug messages includes at least one of debugging information entries, command debug request packets, and command debug reply packets. The computer, utilizing the debugger client within the privilege separation container outside the trusted execution environment, sends the set of microservice debug messages received from the client device of the user to debug the microservice to the debugger server within the trusted execution environment via the secure channel between the privilege separation secure channel server within the privilege separation container outside the trusted execution environment and the privilege separation secure channel client within the trusted execution environment (step 536).

The computer, utilizing the privilege separation secure channel client within the trusted execution environment, inspects the set of microservice debug messages received from the client device of the user to verify that the set of microservice debug messages are valid messages (step 538). The computer, utilizing the privilege separation secure channel client within the trusted execution environment, allows the set of microservice debug messages received from the client device of the user to debug the microservice to pass to the debugger server within the trusted execution environment in response to verifying that the set of microservice debug messages are valid messages (step 540).

The computer, utilizing the debugger server within the trusted execution environment, performs a debug operation on the microservice in real time while running in the trusted execution environment based on the set of microservice debug messages received from the client device of the user (step 542). The computer, utilizing the debugger server within the trusted execution environment, sends a microservice debug result of performing the debug operation on the microservice while running in the trusted execution environment to the debugger client within the privilege separation container outside the trusted execution environment via the secure channel between the privilege separation secure channel client within the trusted execution environment and the privilege separation secure channel server within the privilege separation container outside the trusted execution environment (step 544). The computer, utilizing the debugger client within the privilege separation container outside the trusted execution environment, sends the microservice debug result of performing the debug operation on the microservice while running in the trusted execution environment to the client device of the user (step 546). Thereafter, the process terminates.

Thus, illustrative embodiments of the present disclosure provide a computer-implemented method, computer system, and computer program product for debugging a microservice running in a trusted execution environment. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for trusted execution environment microservice debugging, the computer-implemented method comprising:

monitoring, by a computer, using a privilege separation secure channel client within a trusted execution environment, an internet protocol address and port number of a privilege separation secure channel server within a privilege separation container outside the trusted execution environment;

determining, by the computer, using the privilege separation secure channel client within the trusted execution environment, whether the privilege separation secure channel server within the privilege separation container outside the trusted execution environment is available for a new connection based on monitoring the internet protocol address and the port number of the privilege separation secure channel server;

responsive to the computer determining, using the privilege separation secure channel client within the trusted execution environment, that the privilege separation secure channel server within the privilege separation container outside the trusted execution environment is available for the new connection based on monitoring the internet protocol address and the port number of the privilege separation secure channel server, establishing, by the computer, using the privilege separation secure channel client within the trusted execution environment, the new connection with the privilege separation secure channel server within the privilege separation container outside the trusted execution environment via the internet protocol address and the port number of the privilege separation secure channel server;

performing, by the computer, utilizing a debugger server within the trusted execution environment, a debug operation on a microservice while running in the trusted execution environment based on a set of microservice debug messages received from a client device of a user;

sending, by the computer, utilizing the debugger server within the trusted execution environment, a microservice debug result of performing the debug operation on the microservice while running in the trusted execution environment to a debugger client within the privilege separation container outside the trusted execution environment via a secure channel between the privilege separation secure channel client within the trusted execution environment and the privilege separation secure channel server within the privilege separation container outside the trusted execution environment; and sending, by the computer, utilizing the debugger client within the privilege separation container outside the trusted execution environment, the microservice debug result of performing the debug operation on the microservice while running in the trusted execution environment to the client device of the user.

2. The computer-implemented method of claim 1, further comprising:

utilizing, by the computer, the debugger client within the privilege separation container outside the trusted execution environment to receive the set of microservice debug messages from the client device of the user to debug the microservice while running in the trusted execution environment, the set of microservice debug messages includes at least one of debugging information entries, command debug request packets, and command debug reply packets; and sending, by the computer, utilizing the debugger client within the privilege separation container outside the trusted execution environment, the set of microservice debug messages received from the client device of the user to debug the microservice to the debugger server within the trusted execution environment via the secure channel between the privilege separation secure channel server within the privilege separation container outside the trusted execution environment and the privilege separation secure channel client within the trusted execution environment.

3. The computer-implemented method of claim 1, further comprising:

receiving, by the computer, an input to start the trusted execution environment within a processor of the computer;

starting, by the computer, the trusted execution environment within the processor of the computer in response to receiving the input; and starting, by the computer, using the trusted execution environment, the microservice deployed in the trusted execution environment in response to starting the trusted execution environment.

4. The computer-implemented method of claim 1, further comprising:

starting, by the computer, using the trusted execution environment, the privilege separation secure channel client within the trusted execution environment in response to starting the microservice;

starting, by the computer, the privilege separation container on the computer outside the trusted execution environment in response to starting the privilege separation secure channel client within the trusted execution environment; and starting, by the computer, using the privilege separation container outside the trusted execution environment, the privilege separation secure channel server within the privilege separation container in response to starting the privilege separation container outside the trusted execution environment.

5. The computer-implemented method of claim 1, further comprising:

performing, by the computer, using the privilege separation secure channel client within the trusted execution environment, public key infrastructure authentication to verify that the privilege separation secure channel server within the privilege separation container outside the trusted execution environment is valid in response to establishing the new connection with the privilege separation secure channel server; and determining, by the computer, using the privilege separation secure channel client within the trusted execution environment, whether the privilege separation secure channel server within the privilege separation container outside the trusted execution environment is valid based on the public key infrastructure authentication.

6. The computer-implemented method of claim 5, further comprising:

responsive to the computer, using the privilege separation secure channel client within the trusted execution environment, determining that the privilege separation secure channel server within the privilege separation container outside the trusted execution environment is not valid based on the public key infrastructure authentication, closing, by the computer, using the privilege separation secure channel client within the trusted execution environment, the new connection with the privilege separation secure channel server within the privilege separation container outside the trusted execution environment.

7. The computer-implemented method of claim 5, further comprising:

responsive to the computer, using the privilege separation secure channel client within the trusted execution environment, determining that the privilege separation secure channel server within the privilege separation container outside the trusted execution environment is valid based on the public key infrastructure authentication, establishing, by the computer, using the privilege separation secure channel client within the trusted execution environment, the secure channel with the privilege separation secure channel server within the privilege separation container outside the trusted execution environment; and launching, by the computer, using the privilege separation secure channel client within the trusted execution environment, the debugger server within the trusted execution environment in response to establishing the secure channel with the privilege separation secure channel server within the privilege separation container outside the trusted execution environment.

8. The computer-implemented method of claim 1, further comprising:

directing, by the computer, using the privilege separation secure channel client within the trusted execution environment, the debugger server within the trusted execution environment to attach to the microservice running in the trusted execution environment; and launching, by the computer, using the privilege separation secure channel server within the privilege separation container outside the trusted execution environment, the debugger client within the privilege separation container outside the trusted execution environment in response to the debugger server within the trusted execution environment attaching to the microservice running in the trusted execution environment.

9. The computer-implemented method of claim 1, further comprising:

inspecting, by the computer, utilizing the privilege separation secure channel client within the trusted execution environment, the set of microservice debug messages received from the client device of the user to verify that the set of microservice debug messages are valid messages; and allowing, by the computer, utilizing the privilege separation secure channel client within the trusted execution environment, the set of microservice debug messages received from the client device of the user to debug the microservice to pass to the debugger server within the trusted execution environment in response to verifying that the set of microservice debug messages are valid messages.

10. A computer system for trusted execution environment microservice debugging, the computer system comprising:

a communication fabric;

a set of computer-readable storage media connected to the communication fabric, wherein the set of computer-readable storage media collectively stores program instructions; and a set of processors connected to the communication fabric, wherein the set of processors executes the program instructions to:

monitor, using a privilege separation secure channel client within a trusted execution environment, an internet protocol address and port number of a privilege separation secure channel server within a privilege separation container outside the trusted execution environment;

determine, using the privilege separation secure channel client within the trusted execution environment, whether the privilege separation secure channel server within the privilege separation container outside the trusted execution environment is available for a new connection based on monitoring the internet protocol address and the port number of the privilege separation secure channel server;

establish, using the privilege separation secure channel client within the trusted execution environment, the new connection with the privilege separation secure channel server within the privilege separation container outside the trusted execution environment via the internet protocol address and the port number of the privilege separation secure channel server in response to determining that the privilege separation secure channel server within the privilege separation container outside the trusted execution environment is available for the new connection based on monitoring the internet protocol address and the port number of the privilege separation secure channel server;

perform, utilizing a debugger server within the trusted execution environment, a debug operation on a microservice while running in the trusted execution environment based on a set of microservice debug messages received from a client device of a user;

send, utilizing the debugger server within the trusted execution environment, a microservice debug result of performing the debug operation on the microservice while running in the trusted execution environment to a debugger client within the privilege separation container outside the trusted execution environment via a secure channel between the privilege separation secure channel client within the trusted execution environment and the privilege separation secure channel server within the privilege separation container outside the trusted execution environment; and send, utilizing the debugger client within the privilege separation container outside the trusted execution environment, the microservice debug result of performing the debug operation on the microservice while running in the trusted execution environment to the client device of the user.

11. The computer system of claim 10, wherein the set of processors further executes the program instructions to:

utilize the debugger client within the privilege separation container outside the trusted execution environment to receive the set of microservice debug messages from the client device of the user to debug the microservice while running in the trusted execution environment, the set of microservice debug messages includes at least one of debugging information entries, command debug request packets, and command debug reply packets; and send, utilizing the debugger client within the privilege separation container outside the trusted execution environment, the set of microservice debug messages received from the client device of the user to debug the microservice to the debugger server within the trusted execution environment via the secure channel between the privilege separation secure channel server within the privilege separation container outside the trusted execution environment and the privilege separation secure channel client within the trusted execution environment.

12. The computer system of claim 10, wherein the set of processors further executes the program instructions to:

receive an input to start the trusted execution environment within a processor of the set of processors;

start the trusted execution environment within the processor of the set of processors in response to receiving the input; and start, using the trusted execution environment, the microservice deployed in the trusted execution environment in response to starting the trusted execution environment.

13. The computer system of claim 10, wherein the set of processors further executes the program instructions to:

start, using the trusted execution environment, the privilege separation secure channel client within the trusted execution environment in response to starting the microservice;

start the privilege separation container on the computer system outside the trusted execution environment in response to starting the privilege separation secure channel client within the trusted execution environment; and start, using the privilege separation container outside the trusted execution environment, the privilege separation secure channel server within the privilege separation container in response to starting the privilege separation container outside the trusted execution environment.

14. A computer program product for trusted execution environment microservice debugging, the computer program product comprising a set of computer-readable storage media having program instructions collectively stored therein, the program instructions executable by a computer to cause the computer to:

monitor, using a privilege separation secure channel client within a trusted execution environment, an internet protocol address and port number of a privilege separation secure channel server within a privilege separation container outside the trusted execution environment;

determine, using the privilege separation secure channel client within the trusted execution environment, whether the privilege separation secure channel server within the privilege separation container outside the trusted execution environment is available for a new connection based on monitoring the internet protocol address and the port number of the privilege separation secure channel server;

establish, using the privilege separation secure channel client within the trusted execution environment, the new connection with the privilege separation secure channel server within the privilege separation container outside the trusted execution environment via the internet protocol address and the port number of the privilege separation secure channel server in response to determining that the privilege separation secure channel server within the privilege separation container outside the trusted execution environment is available for the new connection based on monitoring the internet protocol address and the port number of the privilege separation secure channel server;

perform, utilizing a debugger server within the trusted execution environment, a debug operation on a microservice while running in the trusted execution environment based on a set of microservice debug messages received from a client device of a user;

send, utilizing the debugger server within the trusted execution environment, a microservice debug result of performing the debug operation on the microservice while running in the trusted execution environment to a debugger client within the privilege separation container outside the trusted execution environment via a secure channel between the privilege separation secure channel client within the trusted execution environment and the privilege separation secure channel server within the privilege separation container outside the trusted execution environment; and send, utilizing the debugger client within the privilege separation container outside the trusted execution environment, the microservice debug result of performing the debug operation on the microservice while running in the trusted execution environment to the client device of the user.

15. The computer program product of claim 14, wherein the program instructions further cause the computer to:

utilize the debugger client within the privilege separation container outside the trusted execution environment to receive the set of microservice debug messages from the client device of the user to debug the microservice while running in the trusted execution environment, the set of microservice debug messages includes at least one of debugging information entries, command debug request packets, and command debug reply packets; and send, utilizing the debugger client within the privilege separation container outside the trusted execution environment, the set of microservice debug messages received from the client device of the user to debug the microservice to the debugger server within the trusted execution environment via the secure channel between the privilege separation secure channel server within the privilege separation container outside the trusted execution environment and the privilege separation secure channel client within the trusted execution environment.

16. The computer program product of claim 14, wherein the program instructions further cause the computer to:

receive an input to start the trusted execution environment within a processor of the computer;

start the trusted execution environment within the processor of the computer in response to receiving the input; and start, using the trusted execution environment, the microservice deployed in the trusted execution environment in response to starting the trusted execution environment.

17. The computer program product of claim 14, wherein the program instructions further cause the computer to:

start, using the trusted execution environment, the privilege separation secure channel client within the trusted execution environment in response to starting the microservice;

start the privilege separation container on the computer outside the trusted execution environment in response to starting the privilege separation secure channel client within the trusted execution environment; and start, using the privilege separation container outside the trusted execution environment, the privilege separation secure channel server within the privilege separation container in response to starting the privilege separation container outside the trusted execution environment.

* * * * *